(12) United States Patent
Ono

(10) Patent No.: US 8,181,012 B2
(45) Date of Patent: May 15, 2012

(54) IMAGE PROCESSING APPARATUS TRANSMITTING ENCRYPTED DOCUMENT TO ANOTHER APPARATUS, CONTROL METHOD THEREOF, AND PROGRAM PRODUCT FOR INFORMATION PROCESSING

(75) Inventor: Tomomi Ono, Akashi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 893 days.

(21) Appl. No.: 11/437,813

(22) Filed: May 22, 2006

(65) Prior Publication Data

US 2007/0198827 A1    Aug. 23, 2007

(30) Foreign Application Priority Data

Feb. 23, 2006   (JP) ................................ 2006-047029

(51) Int. Cl.
*H04L 29/06* (2006.01)
(52) U.S. Cl. ........... 713/153; 713/189; 726/26; 709/206
(58) Field of Classification Search ................. 713/153, 713/189; 726/26; 709/206
See application file for complete search history.

(56) References Cited

U.S. PATENT DOCUMENTS

| 5,585,854 | A  | * | 12/1996 | Makino ........................ 358/407 |
| 5,892,587 | A  | * | 4/1999  | Okada et al. .................. 358/402 |
| 6,160,631 | A  |   | 12/2000 | Okimoto et al. |
| 6,378,070 | B1 | * | 4/2002  | Chan et al. .................... 713/155 |
| 6,721,071 | B1 |   | 4/2004  | Maruyama |
| 6,775,382 | B1 | * | 8/2004  | Al-Salqan .................... 380/286 |
| 6,938,065 | B2 | * | 8/2005  | Jain ................................. 709/201 |
| 6,963,417 | B1 |   | 11/2005 | Saito |
| 6,965,443 | B2 |   | 11/2005 | Kato |
| 6,980,331 | B1 |   | 12/2005 | Mooney et al. |
| 7,222,368 | B2 | * | 5/2007  | Wiley et al. .................... 726/27 |
| 7,236,970 | B1 | * | 6/2007  | Winslow ........................ 707/3 |
| 7,284,277 | B2 | * | 10/2007 | Lewis ............................. 726/29 |
| 7,353,204 | B2 | * | 4/2008  | Liu ................................. 705/50 |
| 7,409,425 | B2 | * | 8/2008  | Naick et al. ................... 709/206 |
| 2001/0004424 | A1 | * | 6/2001 | Mutoh et al. ................... 399/81 |
| 2002/0054334 | A1 | * | 5/2002 | Harrison et al. ............. 358/1.15 |
| 2003/0016407 | A1 | * | 1/2003 | Satoh ............................. 358/524 |

(Continued)

FOREIGN PATENT DOCUMENTS

JP          10-320311       12/1998

(Continued)

OTHER PUBLICATIONS

Japanese Office Action mailed on Sep. 16, 2008 directed towards counterpart foreign application No. 2006-047029; 4 pages.

*Primary Examiner* — Michael Pyzocha
(74) *Attorney, Agent, or Firm* — Morrison & Foerster LLP

(57) ABSTRACT

An information processing apparatus transmits an encrypted document to a destination that is received as the destination of the encrypted document, stores the received destination, and determines whether the stored destination is a correct destination or not. If it is determined to be the correct destination, it transmits a decryption key of the encrypted document to the relevant destination.

19 Claims, 11 Drawing Sheets

U.S. PATENT DOCUMENTS

| | | | |
|---|---|---|---|
| 2003/0043403 A1* | 3/2003 | Tashima | 358/1.15 |
| 2003/0081247 A1* | 5/2003 | Sharma | 358/1.15 |
| 2004/0170443 A1* | 9/2004 | Maeshima | 399/82 |
| 2005/0010801 A1* | 1/2005 | Spies et al. | 713/200 |
| 2005/0066009 A1* | 3/2005 | Keohane et al. | 709/207 |
| 2005/0268089 A1* | 12/2005 | Kim et al. | 713/153 |
| 2006/0143479 A1* | 6/2006 | Morita | 713/193 |

FOREIGN PATENT DOCUMENTS

| | | |
|---|---|---|
| JP | 2000-99421 | 4/2000 |
| JP | 2001-236274 | 8/2001 |
| JP | 2003-223399 | 8/2003 |
| JP | 2003-258914 | 9/2003 |
| JP | 2005-277976 | 10/2005 |

* cited by examiner

FIG.5

| STATE | LIST | DESTINATION |
|---|---|---|
| A | | A / B / C |
| B | A / B / C | A / B / C |
| C | A / B / C | A / B / D |
| D | | D |
| E | D | |

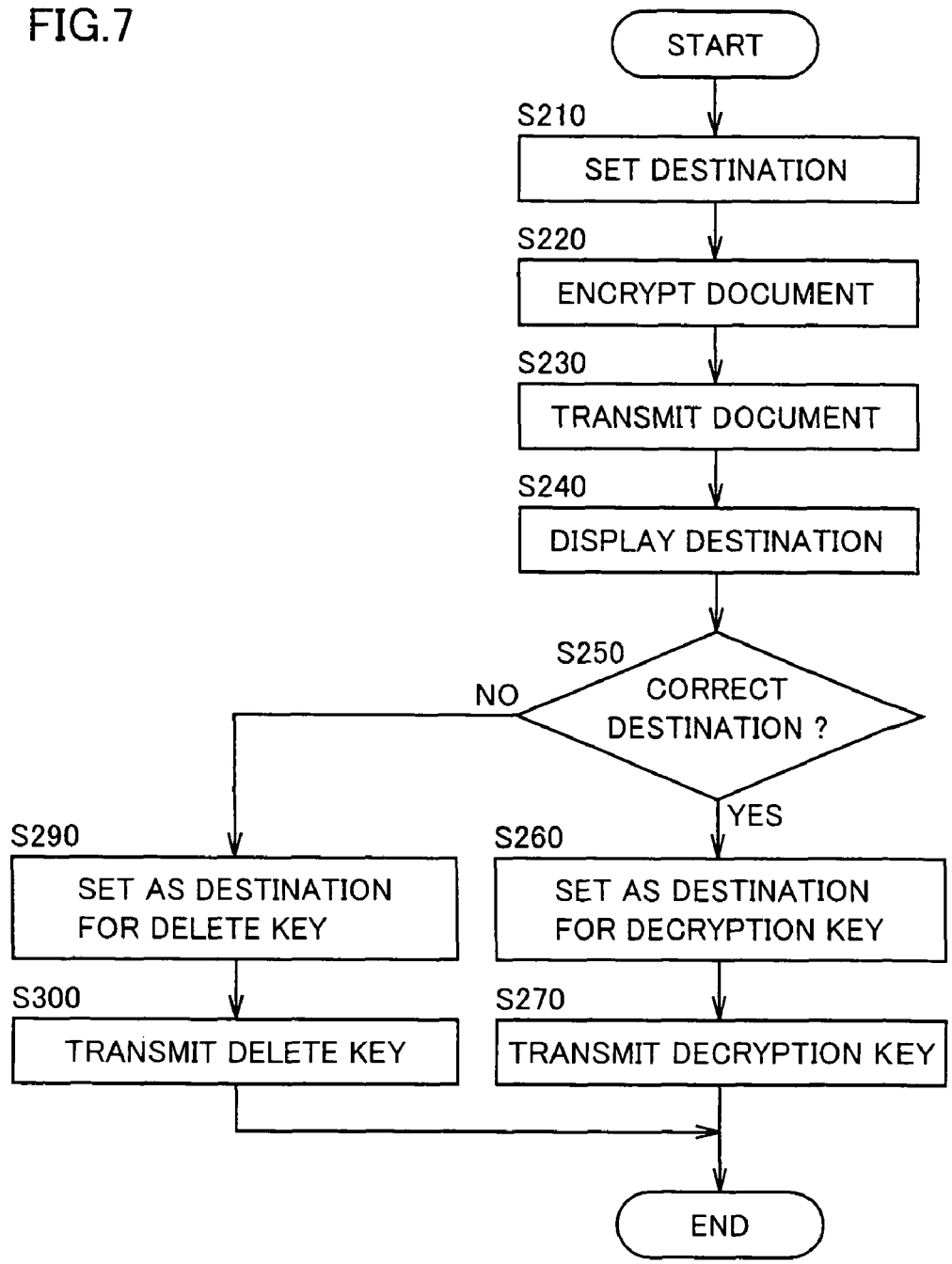

ENCRYPTION CANCEL KEY FOR THE FOLLOWING
TRANSMISSION JOB IS TRANSMITTED.

SENDING USER         : Allan
SENDING DATE         : December, 7/2005
NUMBER OF PAGES      : 5 PAGES
TRANSMISSION JOB ID  : 20051107001
DESTINATION          : A, B, C

YES    NO 1531    1532

ENCRYPTION CANCEL KEY FOR THE FOLLOWING
TRANSMISSION JOB IS TRANSMITTED.

SENDING USER         : Allan
SENDING DATE         : December, 7/2005
NUMBER OF PAGES      : 5 PAGES
TRANSMISSION JOB ID  : 20051107001
DESTINATION          : A, B, C DESTINATION: A   YES  ~1531   NO  ~1532
DESTINATION: B   YES  ~1531   NO  ~1532
DESTINATION: C   YES  ~1531   NO  ~1532

ENTER

1533

IMAGE PROCESSING APPARATUS TRANSMITTING ENCRYPTED DOCUMENT TO ANOTHER APPARATUS, CONTROL METHOD THEREOF, AND PROGRAM PRODUCT FOR INFORMATION PROCESSING

This application is based on Japanese Patent Application No. 2006-047029 filed with the Japan Patent Office on Feb. 23, 2006, the entire content of which is hereby incorporated by reference.

BACKGROUND OF THE INVENTION

1. Field of the Invention

The present invention relates to an information processing apparatus, and more particularly to an information processing apparatus that transmits an encrypted document to another apparatus, a control method thereof, and a program product for information processing.

2. Description of the Related Art

Transmission/reception of mails between computer systems via a communication network such as the Internet has conventionally been performed.

Upon such transmission/reception of mails, a user may erroneously transmit a mail to a wrong destination.

To address such a situation, a variety of techniques have conventionally been proposed to prevent such an erroneously transmitted mail from being output on the receiver side.

For example, Japanese Laid-Open Patent Publication No. 10-320311 discloses a technique used in a mail transmission system capable of transmitting a mail to another computer system, wherein among the already transmitted mails, for the one of which printing by a computer system on the receiver side is not desired, a cancel mail describing an instruction to stop printing is transmitted.

Further, Japanese Laid-Open Patent Publication No. 2001-236274 discloses a technique used in a network facsimile device, wherein upon receipt of a transmission cancel request mail from a user requesting cancellation of the electronic mail already transmitted, the designated electronic mail is discarded without being output.

With the conventional techniques, however, output of the erroneously transmitted mail or the like on the receiver side cannot be prevented if the transmitted mail is output before issuance of the instruction to stop printing or the instruction to cancel the transmission.

SUMMARY OF THE INVENTION

In view of the foregoing, an object of the present invention is to provide an information processing apparatus that can surely prevent output of an erroneously transmitted mail or the like on the receiver side, a control method thereof, and a program product for information processing.

An information processing apparatus according to the present invention includes: an encrypting portion encrypting a document; a document transmission destination receiving portion receiving designation of a destination for transmitting the document encrypted by the encryption portion; a storage portion storing the destination received by the document transmission destination receiving portion; a first transmission portion transmitting the document encrypted by the encryption portion to the destination received by the document transmission destination receiving portion; a determination portion determining whether the destination stored in the storage portion is a correct destination; and a second transmission portion transmitting a decryption key of the document encrypted by the encryption portion to the destination when the determination portion determines that it is the correct destination.

A program product according to the present invention is a program product for controlling an apparatus that transmits a document. The program product causes a computer to execute: an encryption step of encrypting a document; a document transmission destination receiving step of receiving designation of a destination for transmitting the document encrypted in the encryption step; a storing step of storing the destination received in the document transmission destination receiving step; a first transmission step of transmitting the document encrypted in the encryption step to the destination received in the document transmission destination receiving step; a determination step of determining whether the destination stored in the storing step is a correct destination; and a second transmission step of transmitting a decryption key of the document encrypted in the encryption step to the destination determined to be the correct destination in the determination step.

A control method of an information processing apparatus according to the present invention is a control method of an information processing apparatus that includes a storage device and transmits a document. The control method includes: an encryption step of encrypting a document; a document transmission destination receiving step of receiving designation of a destination for transmitting the document encrypted in the encryption step; a storing step of storing the destination received in the document transmission destination receiving step in the storage device; a first transmission step of transmitting the document encrypted in the encryption step to the destination received in the document transmission destination receiving step; a determination step of determining whether the destination stored in the storing step is a correct destination; and a second transmission step of transmitting a decryption key of the document encrypted in the encryption step to the destination determined to be the correct destination in the determination step.

According to the present invention, even if a user intended to transmit a document once designates a wrong destination as the destination for transmitting an encrypted document, it is possible to determine whether the destination is correct or not before transmitting a decryption key of the encrypted document. Accordingly, unless the user erroneously designates the destination upon determination, it is possible to prevent the document transmitted to an undesired destination from being output on that receiver side.

Accordingly, in transmitting a document using an information processing apparatus, it is possible to surely prevent output of an erroneously transmitted mail or other document on the receiver side.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 schematically shows information regarding a destination when the processing shown in FIG. 4 is carried out.

FIG. 7 is a flowchart of processing that is carried out upon transmission of an electronic mail by the CPU of the image processing apparatus that is a second embodiment of the information processing apparatus of the present invention.

FIGS. 8A and 8B show by way of example display screens of a display unit of the image processing apparatus that is the second embodiment of the information processing apparatus of the present invention.

DESCRIPTION OF THE PREFERRED EMBODIMENTS

Figure 1:
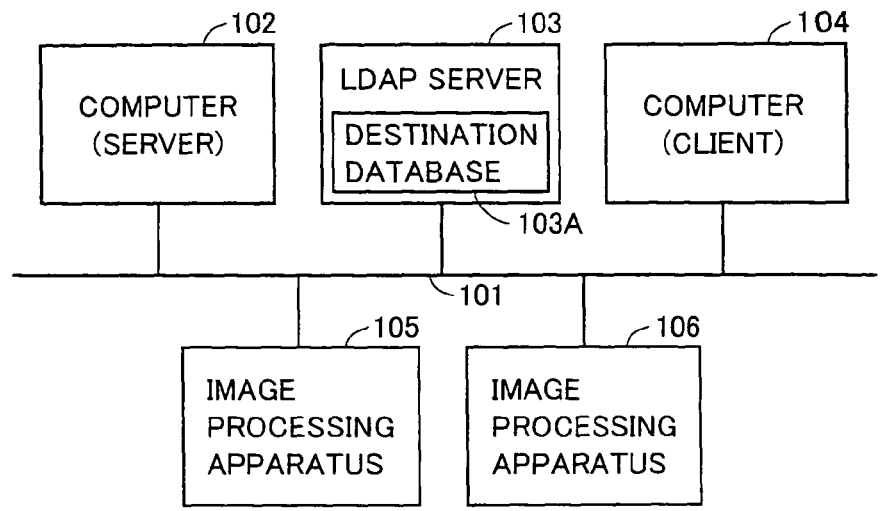
FIG. 1 schematically shows a configuration of an information processing system including the image processing apparatus that is a first embodiment of the information processing apparatus of the present invention.

Hereinafter, embodiments of the present invention will be described with reference to the drawings. In the drawings, the portions denoted by the same reference characters have similar functions, unless otherwise specified.

First Embodiment

FIG. 1 schematically shows a configuration of an information processing system including an information processing apparatus according to a first embodiment of the present invention.

This system is configured as a system that performs data communication via a network (e.g., LAN (Local Area Network)) 101. In this system, a number of network equipment are connected via network 101. The network equipment herein includes computers 102, 104, an LDAP (Lightweight Directory Access Protocol) server 103, and image processing apparatuses 105, 106. In the present invention, the number of network equipment connected to network 101 is not limited to that shown in FIG. 1.

Image processing apparatuses 105, 106 may each be formed of a multi-purpose image processing apparatus, such as an MFP (Multi Function Peripheral), which functions as an image reader, a facsimile device, a printer, a copying machine, and the like. Image processing apparatuses 105, 106 are each capable of transmitting, via network 101, image data input from an external image reader (including one not shown in FIG. 1) or stored in an internal storage portion by reading an original by image processing apparatus 105, 106 itself, or document data input from an external computer. In the present embodiment, description will be made using image processing apparatus 105 as an embodiment of the information processing apparatus of the present invention. It is noted that image processing apparatus 106 has configurations and functions identical to those of image processing apparatus 105, unless otherwise specified.

Computer 102 operates as a server. LDAP server 103 has a destination database 103A, in which destination address information within network 101 is registered. Computer 104 operates as a client.

Figure 2:
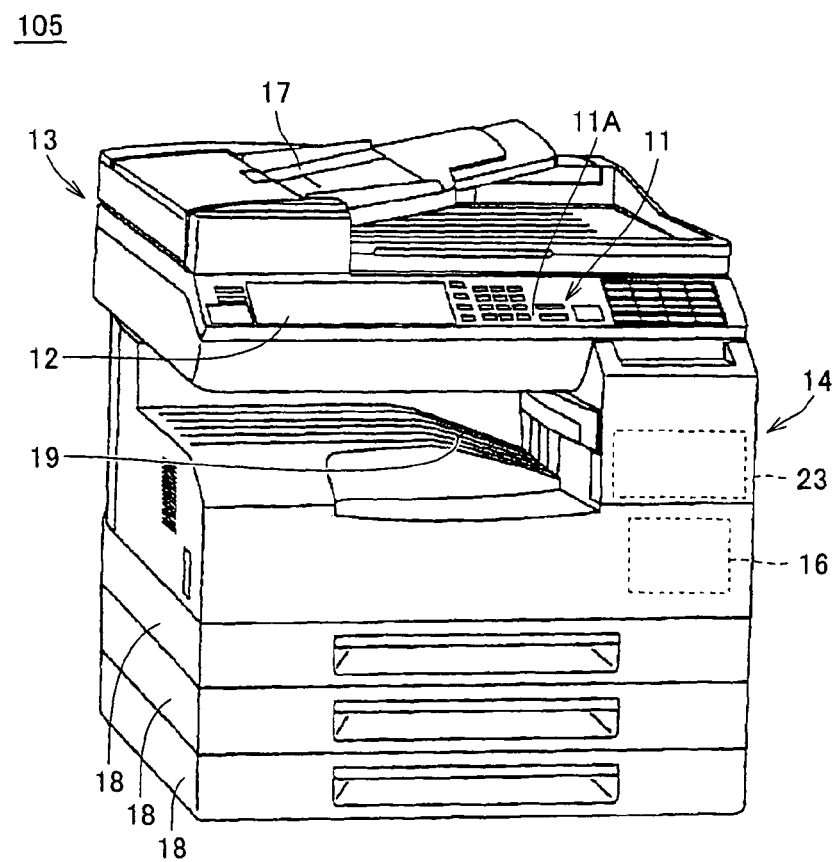
FIG. 2 shows an appearance of an image processing apparatus in FIG. 1.

Referring to FIG. 2, image processing apparatus 105 includes an operation unit 11 that receives operation commands for various processing as well as input of data of letters and numerical figures. Operation unit 11 is provided with a plurality of operation keys 11A.

Image processing apparatus 105 further includes a display unit (display) 12 for displaying an operation menu and information regarding an acquired image and others. Display 12 is a touch panel type display, and is configured to display the operation menu and others, and also to receive operations on image processing apparatus 105 by detecting touch operations on the displayed images of the operation buttons.

Image processing apparatus 105 further includes a scanner unit 13 that obtains image data by photoelectrically reading an original, and a printer unit 14 that prints an image on a recording sheet based on the image data.

Image processing apparatus 105 further includes a feeder unit 17 on an upper surface of its main body, which delivers an original to scanner unit 13, a paper feeding unit 18 below feeder unit 17, which supplies a recording sheet to printer unit 14, and a tray 19 at its center, to which the recording sheet having the image printed thereon by printer unit 14 is ejected. Further, image processing apparatus 105 includes therein a communication unit 16 that transmits/receives data such as image data and the like to/from external equipment via network 101, and a storage portion 23 that stores various kinds of data.

Scanner unit 13 acquires image data by photoelectrically reading image information of photograph, letter, picture and the like from an original. The acquired image data (density data) is processed as appropriate and stored in storage portion 23, which may then be used as data for an attachment file to be attached to an electronic mail, or may be transmitted to printer unit 14 and/or communication unit 16 to be printed as an image or transmitted as data.

Printer unit 14 prints an image on a recording sheet, based on the image data acquired by scanner unit 13, or the image data received from external equipment via communication unit 16, or the like.

Communication unit 16 transmits/receives facsimile data via a public telephone line, and also performs data transmission/reception via a network (including network 101) such as a LAN and the Internet, using a system of electronic mail or the like, with external equipment connected to the network. As such, image processing apparatus 105 functions not only as a facsimile device that performs conventional facsimile communication, but also as a transmission/reception terminal of an electronic mail. This means that it can transmit/receive various kinds of image data in the form of an attachment file to the electronic mail. It is noted that the network communication performed by image processing apparatus 105 may be either wired communication, as shown in FIG. 1, or wireless communication.

Image processing apparatus 105 of the present embodiment can encrypt a document such as an attachment file to an electronic mail when transmitting the same to external equipment. As such, the document attached to the electronic mail is transmitted in the encrypted state. Further, image processing apparatus 105 can transmit a decryption key for use in decoding the encrypted document.

Figure 3:
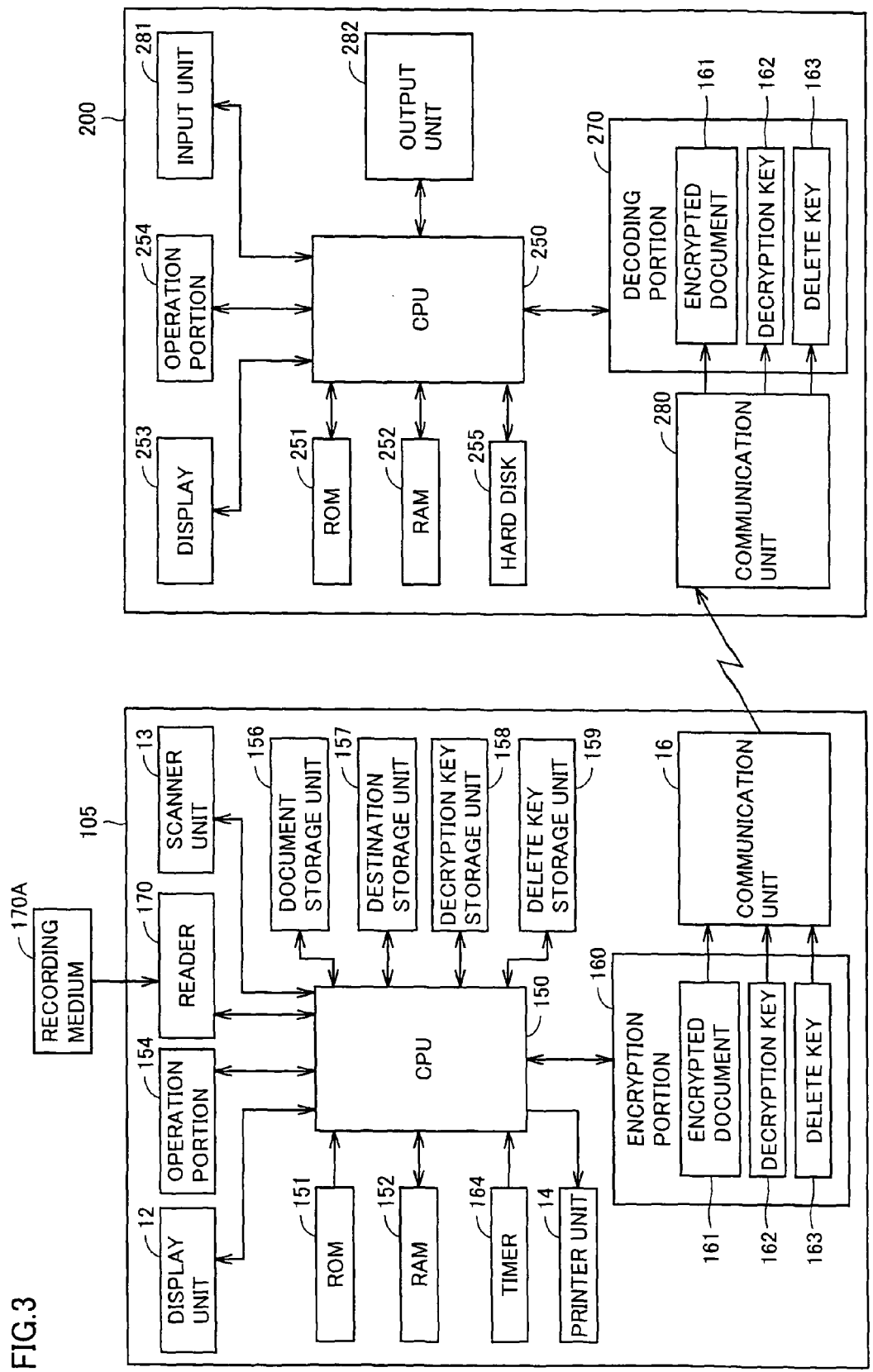
FIG. 3 shows a hardware configuration of the image processing apparatus in FIG. 1 and of a receiver-side apparatus that receives information transmitted from the image processing apparatus.

FIG. 3 shows a hardware configuration of image processing apparatus 105 and a receiver-side apparatus 200 that receives information transmitted from image processing apparatus 105. It is noted that receiver-side apparatus 200 refers to equipment connected to image processing apparatus 105 via network 101, which may be any of computers 102, 104, and image processing apparatus 106.

Referring to FIG. 3, image processing apparatus 105 includes, in addition to display unit 12, scanner unit 13, printer unit 14, and communication unit 16 described above, a CPU 150, a ROM (Read Only Memory) 151, a RAM (Random Access Memory) 152, an operation portion 154, a document storage unit 156, a destination storage unit 157, a decryption key storage unit 158, a delete key storage unit 159, an encryption portion 160, and a timer 164.

CPU 150 uses RAM 152 as a working storage area, in accordance with a program stored in ROM 151 or the like, to carry out processing for controlling the entire operations of image processing apparatus 105. CPU 150 can refer to the time counted by timer 164 when executing the processing. It is noted that image processing apparatus 105 may further include a device (a reader 170), such as a CD-ROM (Compact Disc Read Only Memory) or the like, that can read information recorded on a recoding medium 170A detachable from image processing apparatus 105, in which case CPU 150 may be configured to execute a program stored in recording medium 170A.

Operation portion 154 includes operation unit 11 and operation buttons displayed on display unit 12.

Document storage unit 156, destination storage unit 157, decryption key storage unit 158, and delete key storage unit 159 are included in storage portion 23 described above. Document storage unit 156 stores a document created based on reading of an image by scanner unit 13 or a document acquired from external equipment. Destination storage unit 157 stores electronic mail addresses in association with user names and the like. Decryption key storage unit 158 stores information (decryption key) for decoding the document encrypted by encryption portion 160. Delete key storage unit 159 stores information (delete key) for causing processing of deleting an encrypted document to be carried out when the encrypted document is transmitted to receiver-side apparatus 200.

Encryption portion 160 performs encryption of the document stored in document storage unit 156. The encryption method in this case may be any of well-known methods such as AES (Advanced Encryption Standard), DES (Data Encryption Standard), 3-DES (Triple DES) and the like. Encryption portion 160 stores a document having been encrypted (encrypted document 161), information for decoding the document (decryption key 162), and information for causing the document to be deleted (delete key 163).

Receiver-side apparatus 200 includes a CPU 250 used for control of the apparatus, a ROM 251 and a RAM 252. Receiver-side apparatus 200 further includes a hard disk 255 serving as a main storage, a display 253 that displays information, an operation unit 254 that receives an operation from the outside, an input unit 281 that receives input of image information and the like from the outside, and an output unit 282 that is formed of a printer or the like and outputs information to the outside.

Receiver-side apparatus 200 further includes a communication unit 280 that transmits/receives information to/from external equipment, and a decoding portion 270 for decoding a document when the externally received document has been encrypted. When receiver-side apparatus 200 receives encrypted document 161, decryption key 162 and delete key 163 from the external equipment, they are stored in decoding portion 270. Decoding portion 270 uses decryption key 162 to decode encrypted document 161. When receiving delete key 163, CPU 250 carries out processing of deleting encrypted document 161 corresponding to the relevant delete key 163.

Figure 4:
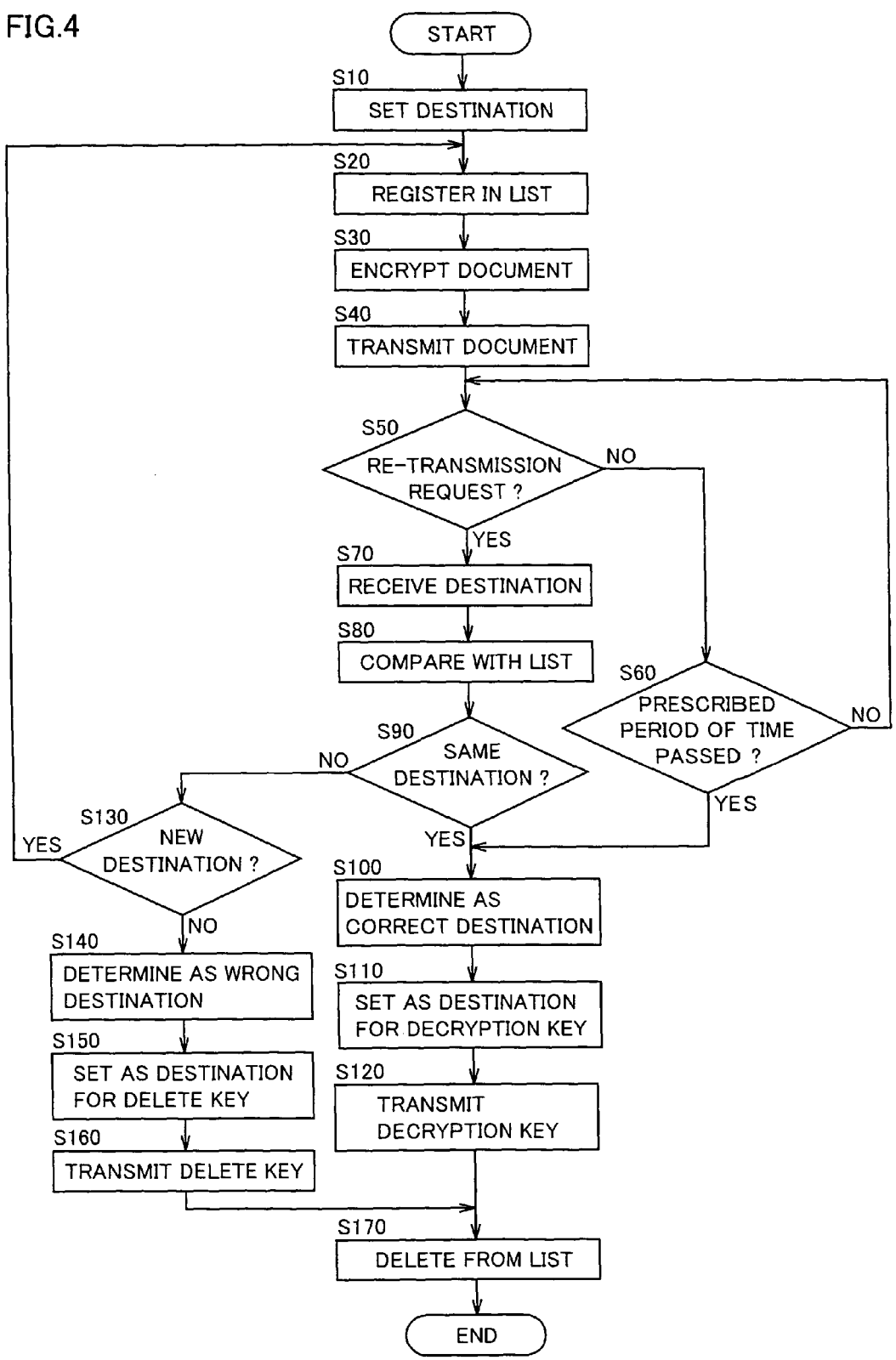
FIG. 4 is a flowchart of processing that is carried out upon transmission of an electronic mail by a CPU (Central Processing Unit) of the image processing apparatus of FIG. 1.

Hereinafter, processing executed by CPU 150 at the time when image processing apparatus 105 transmits an electronic mail with an attached file will be described with reference to a flowchart in FIG. 4. In the following, the attachment file is also referred to as the "document".

Further, FIG. 5 schematically shows information regarding a destination. In FIG. 5, columns of "list" and "destination" are set for states A-E. The "list" refers to a list of destinations stored in destination storage unit 157. The "destination" refers to a destination of an electronic mail that is now to be transmitted by CPU 150, which is temporarily stored in RAM 152 or the like when input from the user.

In image processing apparatus 105, when the text of the electronic mail, the information specifying the document to be attached thereto from the documents stored in document storage unit 156, and the destination of the electronic mail are input via the operation portion 154, in step S110, CPU 150 sets in RAM 152 or the like the input destination as the destination of the electronic mail now to be transmitted.

For example, assume that three places "A", "B" and "C" have been set as the destinations. In this case, these three places are set as the destinations, as shown in state A in FIG. 5.

Next, in step S20, CPU 150 registers the items currently set as the destinations in the list within destination storage unit 157. For example, when step S20 is executed in the state as shown in state A in FIG. 5, information similar to that for the "destination" is also registered in the list, as shown in state B in FIG. 5.

Next, in step S30, CPU 150 reads from document storage unit 156 the document set as the attachment file, and causes encryption portion 160 to encrypt the document and store the resultant document. As such, encrypted document 161 is generated. At this time, decryption key 162 and delete key 163 corresponding to the generated encrypted document 161 are read from decryption key storage unit 158 and delete key storage unit 159, respectively, and stored in encryption portion 160.

Next, in step S40, CPU 150 causes communication unit 16 to transmit an electronic mail having encrypted document 161 as the attachment file to a destination set as the "destination" in destination storage unit 157.

Next, in step S50, CPU 150 determines whether a user has made an operation requesting re-transmission or not. Here, "re-transmission" refers to sending a mail again to the other party to whom encrypted document 161 was transmitted. It is assumed that the mail being re-transmitted has decryption key 162 as the attachment file, instead of encrypted document 161.

Figure 6:
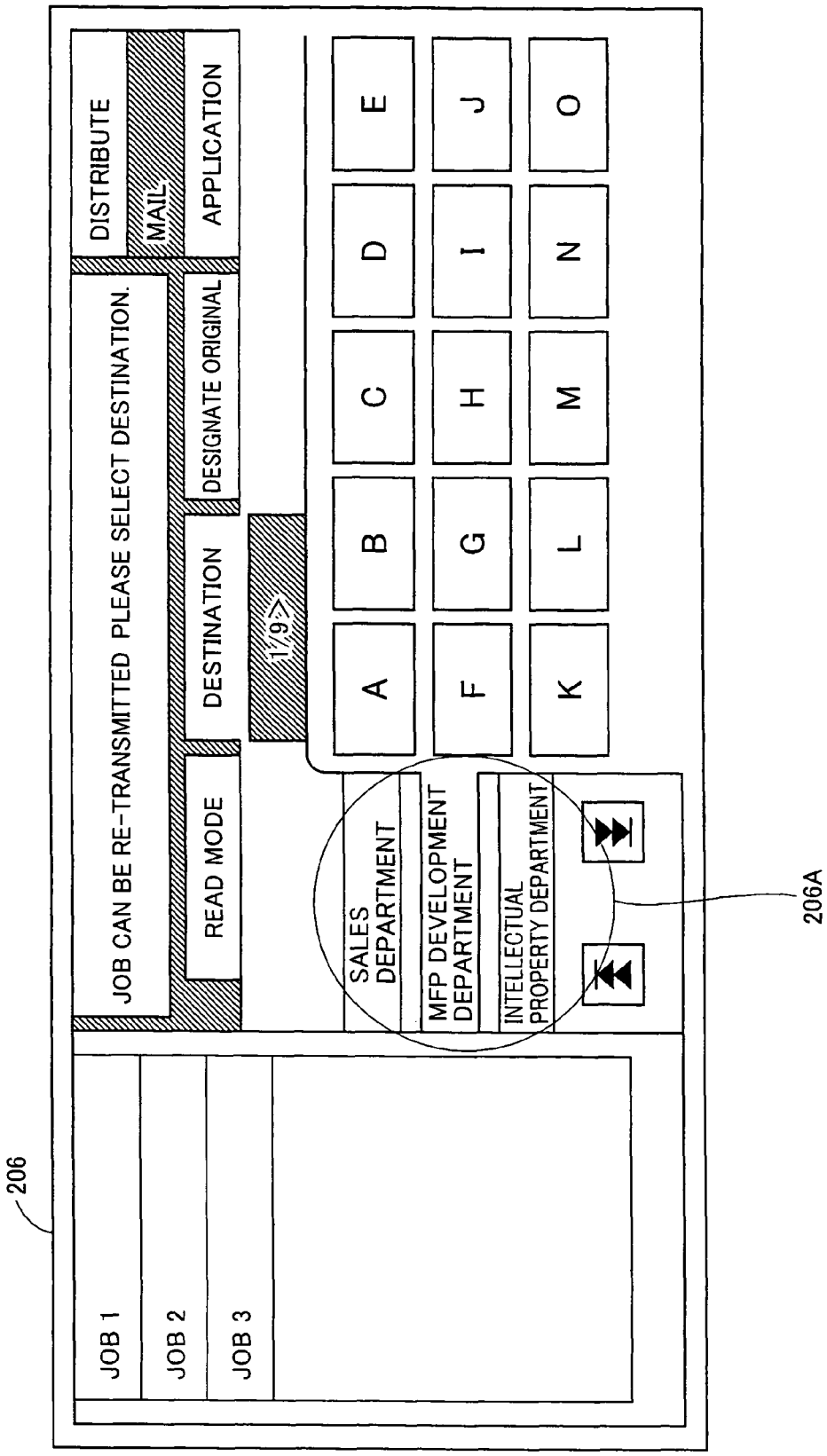
FIG. 6 shows by way of example a display screen of a display unit in FIG. 2.

Specifically, CPU 150 waits for the user's operation by causing display unit 12 to display a screen as shown in FIG. 6. Referring to FIG. 6, a message "Job can be re-transmitted. Please select destination." is displayed on a screen 206. At the same time, three buttons ("Sales Department" "MFP Development Department" "Intellectual Property Department") for selecting a group to designate a destination are displayed in a frame 206A. Further, in FIG. 6, 15 buttons respectively corresponding to specific destinations (from A to O) belonging to the group of the MFP Development Department out of the three groups are displayed. The user can execute an operation to request re-transmission by manipulating any of the 15 buttons corresponding to the destinations.

If CPU 150 determines in step S50 that the operation requesting re-transmission has been executed, the process proceeds to step S70. If it is determined that the operation has not been executed, the process proceeds to step S60.

In step S60, CPU 150 determines whether a prescribed period of time has passed since the document was transmitted in step S40. If it is determined that it has not passed yet, the process returns to step S50. If it is determined that the prescribed period of time has passed, the process proceeds to step S100. That is, CPU 150 enters a stand-by mode to wait for a user's operation requesting re-transmission only for a prescribed period of time. It is noted that the prescribed period of time can be determined as appropriate by a manager of image processing apparatus 105 or the like.

In step S70, CPU 150 receives input of the destination for the re-transmission, and sets it as the "destination". For example, when "A", "B" and "D" are input as the destinations for re-transmission, these three destinations are set in the "destination" column, as shown in state C in FIG. 5.

Next, in step S80, CPU 150 compares the destination set in the "destination" at that time point with the destination set in the "list".

In step S90, CPU 150 determines whether each destination set in the "destination" is also set in the "list" or not. As to the destination for which the same destination has been set, the process proceeds to step S100. As to the destination for which the same destination has not been set, the process proceeds to step S130.

As to the destination having the same destination set in the "list", CPU 150 determines in step S1100 that it is the correct destination. In step S110, CPU 150 sets it as the destination for transmitting decryption key 162, and, in step S120, it transmits an electronic mail having decryption key 162 as the attachment file. In step S170, it deletes the destination to which the electronic mail was transmitted in step S120 from the "list" and the "destination", so that the processing is completed. As such, in the apparatus (receiver-side apparatus 200) having received decryption key 162, encrypted document 161 is decoded by utilizing the relevant decryption key 162, and the document is thus decrypted.

As to the destination for which the same destination is not set in the "list", CPU 150 firstly determines in step S130 whether it is a new destination, i.e., whether it is the destination having been set in the "destination" but not set in the "list". If so, the process returns to step S20. If it is not such a destination, i.e., if the destination is set in the "list" but not included in the "destination", then the process proceeds to step S140.

In step S140, CPU 150 determines the destination having been set in the "list" but not included in the "destination" as a wrong destination, and, in step S150, CPU 150 sets it as the destination for transmitting delete key 163.

In step S160, CPU 150 transmits to the destination set in step S150 an electronic mail having delete key 163 as the attachment file. In doing so, once the electronic mail with delete key 163 as the attached file is opened in the apparatus having received the relevant electronic mail (receiver-side apparatus 200), processing for deleting encrypted document 161 having already been transmitted is automatically executed on the receiver side.

After transmitting the electronic mail in step S160, in step S170, CPU 150 deletes the destination to which the electronic mail was transmitted in step S160 from the "list". The processing is thus completed.

In the above-described embodiment, the destination input for transmitting decryption key 162 (i.e., the destination shown in the "destination" in FIG. 5) is compared with the destination input for transmitting encrypted document 161 (i.e., the destination shown in the "list" in FIG. 5), as indicated as state C in FIG. 5.

Decryption key 162 is then transmitted only to the destination that has been input for transmitting encrypted document 161 and also input for transmitting decryption key 162. That is, in the example shown in FIG. 5, decryption key 162 is transmitted to "A" and "B" set in both of the "list" and the "destination", which are then deleted from both of the "list" and the "destination".

With this configuration, encrypted document 161 is decrypted only at the destination that was set by the user as the destination more than one time. Thus, even if an encrypted document is transmitted to a destination erroneously set, if the relevant destination is not set again as the destination of the decryption key, the encrypted document will not be decoded at the relevant destination.

The destination set only in the "list", i.e., the destination that was input for transmission of encrypted document 161 but not input for transmission of decryption key 162, is regarded as a destination erroneously input upon first transmission of encrypted document 161, and it is deleted from the "list" after delete key 163 is transmitted thereto.

As such, the destination to which decryption key 162 or delete key 163 has been transmitted is deleted from the "list" and the "destination". As a result, only "D" is left in the "destination", as shown in state D.

As to the destination set only in the "destination" in state C, i.e., the destination that failed to be input erroneously at the time of transmission of encrypted document 161 but that was later input at the time of transmission of decryption key 162 as the destination to which encrypted document 161 should have been transmitted, the process returns to step S30, in which the destination is registered in the "list". As such, the destination "D" is set in the "list", as shown in state E.

In the present embodiment, the destination for re-transmission is accepted only during a prescribed period of time. Thus, in the absence of an erroneously set destination, the user does not need to input the destination for re-transmission.

Second Embodiment

The information processing apparatus of the present embodiment has a configuration similar to that of the information processing apparatus (image processing apparatus 105) described in the first embodiment. The information processing apparatus of the present embodiment differs from that of the first embodiment in the contents of processing executed at the time of transmitting an electronic mail having a document as the attachment file. Hereinafter, the processing executed in the image processing apparatus 105 of the present embodiment will be explained with reference to a flowchart in FIG. 7.

In image processing apparatus 105, when the text of the electronic mail, the information specifying the document to be attached thereto from the documents stored in document storage unit 156, and the destination of the electronic mail are input, in step S210, CPU 150 sets the input destination as the destination of the electronic mail now to be transmitted. At this time, CPU 150 registers the set destination in the "list" (see FIG. 5) within destination storage unit 157.

Next, in step S220, CPU 150 causes encryption portion 160 to encrypt the document set as the attachment file. As such, encrypted document 161 is generated. At this time, decryption key 162 and delete key 163 corresponding to the generated encrypted document 161 are also read from decryption key storage unit 158 and delete key storage unit 159, respectively, and stored in encryption portion 160.

In step S230, CPU 150 causes communication unit 16 to transmit the electronic mail having encrypted document 161 as the attachment file to the destination set in step S210.

Next, in step S240, CPU 150 causes display unit 12 to display the destination to which the electronic mail was transmitted in step S230.

In step S250, CPU 150 receives input of information from the user as to whether the displayed destination is the correct destination or not. If it is determined that the information indicating that the destination is correct was input, the process proceeds to step S260. If it is determined that the information indicating that the destination is wrong was input, the process proceeds to step S290.

In step S260, CPU 150 sets the destination registered in the "list" as the destination for transmitting decryption key 162. In step S270, CPU 150 transmits to the destination set in step S260 the electronic mail having decryption key 162 as the attachment file, and the processing is completed. At this time, CPU 150 deletes the destination registered in the "list". With the process in step S270, in the apparatus having received decryption key 162 (receiver-side apparatus 200), decryption key 162 is used to decode encrypted document 161, so that the document is decrypted.

Meanwhile, in step S290, CPU 150 sets the destination registered in the "list" as the destination for transmitting delete key 163. In step S300, CPU 150 transmits the electronic mail having delete key 163 as the attachment file to the destination set in step S290. At this time, CPU 150 deletes the destination registered in the "list". With the process in step S300, in the apparatus (receiver-side apparatus 200) having received the electronic mail having delete key 163 as the attachment file, once the electronic mail is opened, the processing for deleting encrypted document 161 having already been transmitted is automatically carried out.

FIG. 8A shows an example of a screen shown in display unit 12 in step S240.

On the screen 1530, information related to transmission of an electronic mail having encrypted document 161 as the attachment file in image processing apparatus 105 is displayed, which includes information specifying the user who has operated (sending user), date of transmission and the like, as well as destinations of the electronic mail ("A", "B", "C").

Further, on screen 1530, a YES button 1531 and a NO button 1532 are displayed. The user operates YES button 1531 when the destinations displayed are all correct, while the user operates NO button 1532 when there is at least one destination that is not correct. When YES button 1531 is operated, CPU 150 determines that the user has input the information indicating that the destinations are correct, and transmits decryption key 162 to all the destinations. When NO button 1532 is operated, CPU 150 determines that the user has input the information indicating that the destination is wrong, and transmits delete key 163 to all the destinations. In this case, if at least one of the destinations is correct, the user again carries out the operation to transmit the electronic mail having the document as the attachment file to the correct destination(s).

It is noted that, in step S240, CPU 150 may allow display of a screen on which information as to whether the destination is correct or not can be input for each destination, as shown in FIG. 8B.

On the screen 1535, YES button 1531 and NO button 1532 are displayed for each of the destinations, and a decision button 1533 that is operated upon completion of input is also displayed.

In this case, as to the destination for which YES button 1531 was operated, CPU 150 transmits decryption key 162 by executing steps S260 and S270. As to the destination for which NO button 1532 was operated, it transmits delete key 163 by executing steps S290 and S300.

When screen 1535 is displayed, in the information processing apparatus, designation of the destination for transmitting the decryption key is accepted from among the destinations stored in the list, and designation of the destination for transmitting the information for deleting the encrypted document is also accepted. As such, the destination for transmitting the decryption key can be designated from among the destinations stored in the list, which allows the user to set the destination for transmitting the decryption key without the need of remembering to which destination the encrypted document was transmitted. Further, since the destination for transmitting the delete key can also be designated from among the destinations stored in the list, it is ensured that any destination to which the encrypted document was erroneously transmitted can be designated as the destination for transmitting the delete key.

Third Embodiment

Figure 9:
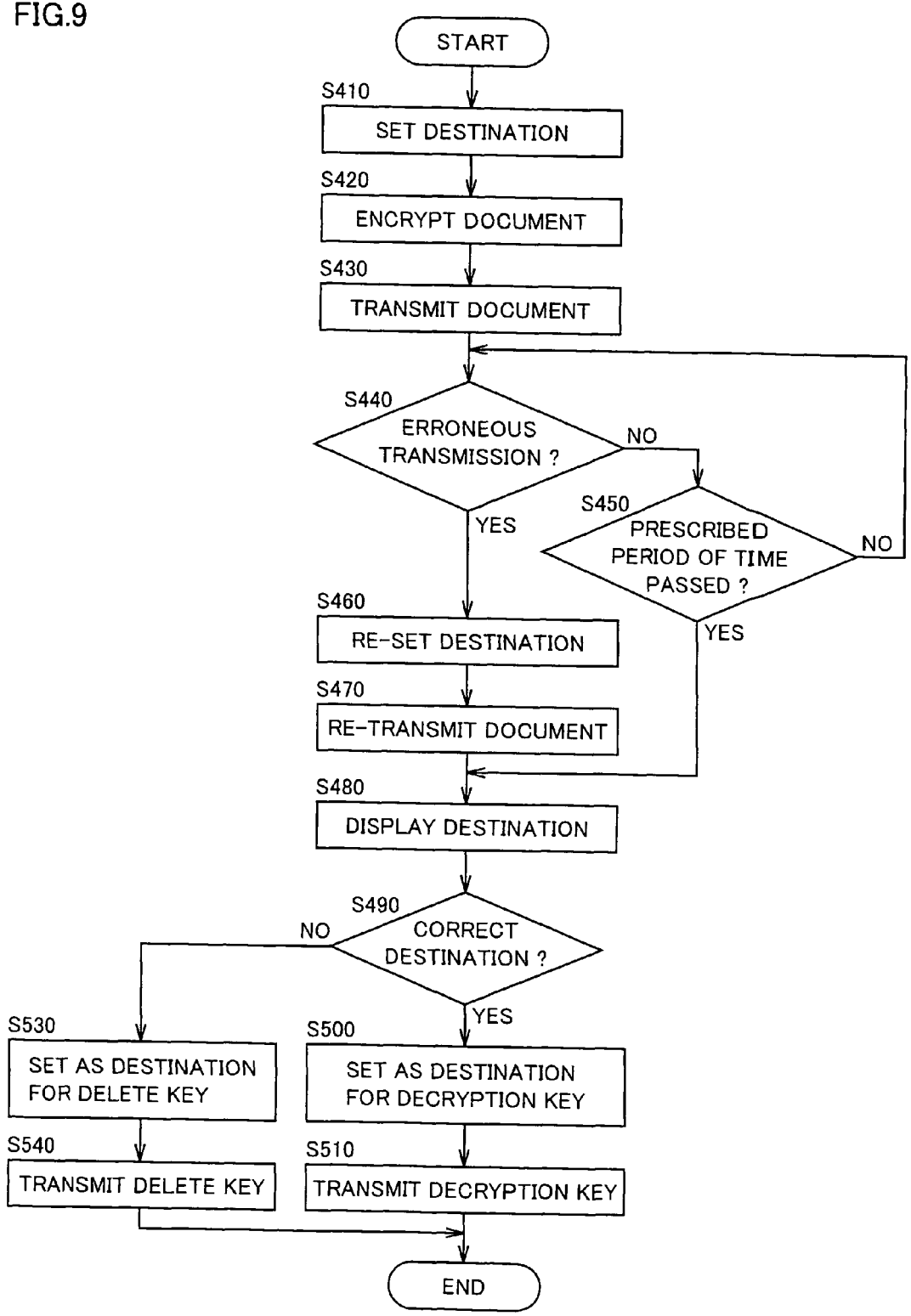
FIG. 9 is a flowchart of processing that is carried out upon transmission of an electronic mail by the CPU of the image processing apparatus that is a third embodiment of the information processing apparatus of the present invention.

The information processing apparatus of the present embodiment has a configuration similar to that of the information processing apparatus (image processing apparatus 105) described in the first embodiment. The information processing apparatus of the present embodiment differs from that of the first embodiment in the contents of processing executed at the time of transmitting an electronic mail having a document as the attachment file. Hereinafter, the processing executed in the image processing apparatus 105 of the present embodiment will be explained with reference to a flowchart in FIG. 9.

In image processing apparatus 105, when the text of the electronic mail, the information specifying the document to be attached thereto from the documents stored in document storage unit 156, and the destination of the electronic mail are input, in step S410, CPU 150 sets the input destination as the destination of the electronic mail now to be transmitted. At this time, CPU 150 registers the set destination in the "list" (see FIG. 5) within destination storage unit 157.

Next, in step S420, CPU 150 causes encryption portion 160 to encrypt the document set as the attachment file. As such, encrypted document 161 is generated. At this time, decryption key 162 and delete key 163 corresponding to the generated encrypted document 161 are also read from decryption key storage unit 158 and delete key storage unit 159, respectively, and stored in encryption portion 160.

In step S430, CPU 150 causes communication unit 16 to transmit the electronic mail having encrypted document 161 as the attachment file to the destination set in step S410.

Next, in step S440, CPU 150 determines whether information indicating that the electronic mail was erroneously transmitted has been input from the user. If it is determined that such information has been input, the process proceeds to S460. If it is determined that such information has not been input, the process proceeds to S450.

In step S450, CPU 150 determines whether a prescribed period of time has passed since the electronic mail was transmitted in step S430. If it is determined that it has not passed yet, the process returns to S440. If it is determined that the prescribed period of time has passed, the process proceeds to step S480. That is, in the present embodiment, the processing in step S460 and in step S470 is executed only if the information to the effect that the electronic mail was erroneously transmitted is input from the user within the prescribed period of time after transmission of the electronic mail in step S430.

In step S460, CPU 150 receives input from the user of information for setting the destination again, and the process proceeds to step S470. The destination set at this time is the destination to which the electronic mail having the encrypted document as the attachment file is to be transmitted, and it is also the destination for transmitting decryption key 162.

In step S470, CPU 150 transmits the electronic mail having the encrypted document as the attachment file to the destination set in step S460. The process then proceeds to step S480.

In step S480, CPU 150 causes display unit 12 to display the destination registered in the "list" (i.e., the destination to which the electronic mail having the encrypted document as the attachment file was transmitted in step S430), and the destination set in step S460 (i.e., the destination to which the electronic mail having the encrypted document as the attachment file was transmitted in step S470).

In step S490, CPU 150 receives input from the user of information as to whether the displayed destinations are correct destinations or not. If it is determined that the information to the effect that the destinations are correct has been input, the process proceeds to step S500. If it is determined that the information to the effect that there is at least one wrong destination has been input, the process proceeds to step S530.

In step S500, CPU 150 sets all the destinations displayed in step S480 as the destinations for transmitting decryption key 162. In step S510, CPU 150 transmits the electronic mail having decryption key 162 as the attachment file to the destinations set in step S500. The processing is thus completed. At this time, CPU 150 deletes the destinations registered in the "list". With the processing in step S510, in the apparatus having received decryption key 162 (receiver-side apparatus 200), decryption key 162 is used to decode encrypted document 161, so that the document is decrypted.

Meanwhile, in step S530, CPU 150 sets all the destinations displayed in step S480 as the destinations for transmitting delete key 163. In step S540, CPU 150 transmits the electronic mail having delete key 163 as the attachment file to the destinations set in step S530. At this time, CPU 150 deletes the destinations registered in the "list". With the processing in step S540, in the apparatus having received the electronic mail having delete key 163 as the attachment file (receiver-side apparatus 200), once the relevant electronic mail is opened, the processing for deleting encrypted document 161 having already been transmitted is automatically executed.

In the present embodiment as well, in step S490, CPU 150 may be configured to receive input of information as to whether the destination is correct or not for each of the displayed destinations, and to execute the processing in steps S500 and S510 for the correct destination, and to execute the processing in steps S530 and S540 for the wrong destination.

Further, in the present embodiment, if the information to the effect that the electronic mail was erroneously transmitted is not input from the user within a prescribed period of time since the electronic mail was transmitted in step S430, the re-setting of the destination is not carried out, and, in step S480, the destination to which the electronic mail was transmitted in step S430 is displayed.

That is, in image processing apparatus 105 of the present embodiment, after transmission of an electronic mail, even if there is no input of information to the effect that the electronic mail was erroneously transmitted, the information prompting the user to designate the destination for transmitting decryption key 162 is displayed after a lapse of a prescribed period of time. This ensures that the user confirms the destination to which the encrypted document was transmitted.

Fourth Embodiment

Figure 10:
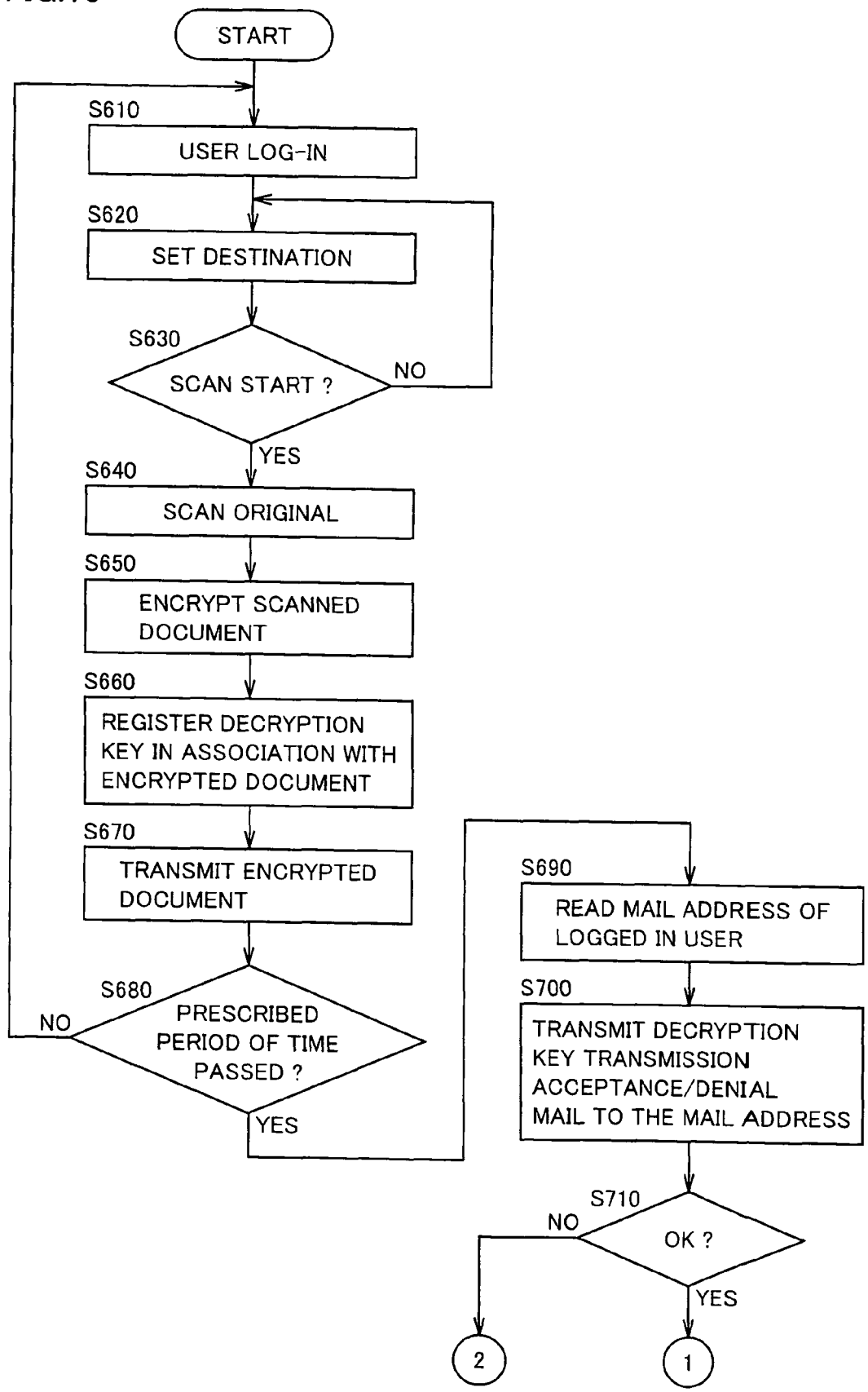
FIGS. 10 and 11 show a flowchart of processing that is carried out upon transmission of an electronic mail by the CPU of the image processing apparatus that is a fourth embodiment of the information processing apparatus of the present invention.
Figure 11:
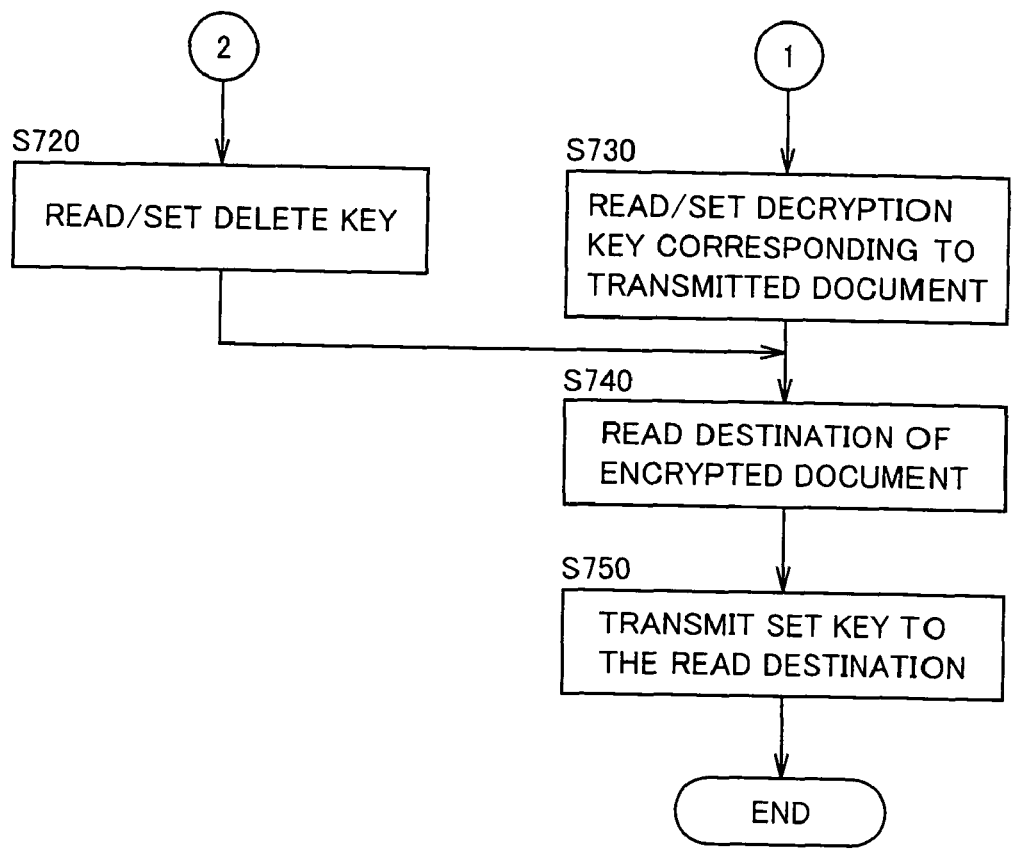

The information processing apparatus of the present embodiment has a configuration similar to that of the information processing apparatus (image processing apparatus 105) described in the first embodiment. The information processing apparatus of the present embodiment differs from that of the first embodiment in the contents of processing executed at the time of transmitting an electronic mail having a document as the attachment file. Hereinafter, the processing executed in the image processing apparatus 105 of the present embodiment will be explained with reference to a flowchart in FIGS. 10 and 11.

Firstly, in step S610, CPU 150 executes the processing for log-in of a user. Specifically, CPU 150 requests the user to input a log-in ID and a password, and determines whether the combination of the input log-in ID and the password is correct. If so, it accepts log-in of the user.

Next, in step S620, CPU 150 receives input of a destination of an electronic mail, and sets the destination as the destination of the electronic mail that is now to be transmitted. At this time, CPU 150 registers the set destination in a "list" (see FIG. 5) within destination storage unit 157.

Next, in step S630, CPU 150 determines whether an operation to designate initiation of scanning of an original was made to operation portion 154. If so, in step S640, CPU 150 causes scanner unit 13 to scan the original.

When the scanning of the original is completed and image data is obtained, in step S650, CPU 150 causes encryption portion 160 to encrypt the image data. As such, encrypted document 161 is generated.

Next, in step S660, CPU 150 reads decryption key 162 and delete key 163 corresponding to the generated encrypted document 161 from decryption key storage unit 158 and decryption key storage unit 159, respectively, and registers them in encryption portion 160.

In step S670, CPU 150 transmits the electronic mail having encrypted document 161 as the attachment file to the destination set in step S620.

In step S680, CPU 150 determines whether a prescribed period of time has passed. The process is returned to step S610 until the prescribed period of time has passed, and awaits long-in of a next user. When the prescribed period of time has passed since completion of transmission of the encrypted document in step S670, the process proceeds to step S690.

In step S690, CPU 150 reads a mail address of the user who designated scanning (and transmission) of the encrypted document transmitted in step S670. It is noted that reading of the mail address is performed, e.g., by retrieving the mail address stored in LDAP server 103 based on the information specifying the user.

Next, in step S700, CPU 150 transmits a decryption key transmission acceptance/denial mail to the mail address read in step S690. Here, the decryption key transmission acceptance/denial mail refers to the mail that prompts the user to transmit information as to whether decryption key 162 corresponding to encrypted document 161 may be transmitted to the destination to which the relevant encrypted document was transmitted in step S670.

In step S710, CPU 150 determines the content of the information transmitted from the user, and the process proceeds to step S730 if the information indicates that decryption key 162 can be transmitted, while it proceeds to step S720 if the information indicates that decryption key 162 should not be transmitted.

In step S720, CPU 150 sets delete key 163 as the key to be transmitted to the destination to which the encrypted document was transmitted in step S670, and the process proceeds to step S740.

Meanwhile, in step S730, CPU 150 sets decryption key 162 as the key to be transmitted to the destination to which the encrypted document was transmitted in step S670, and the process proceeds to step S740.

In step 740, CPU 150 reads from the above-described "list" the destination to which the encrypted document was transmitted in step S670.

In step S750, CPU 150 transmits the electronic mail having the key set in step S720 or S730 as the attachment file to the destination read in step S740. The processing is thus completed.

Figure 12:
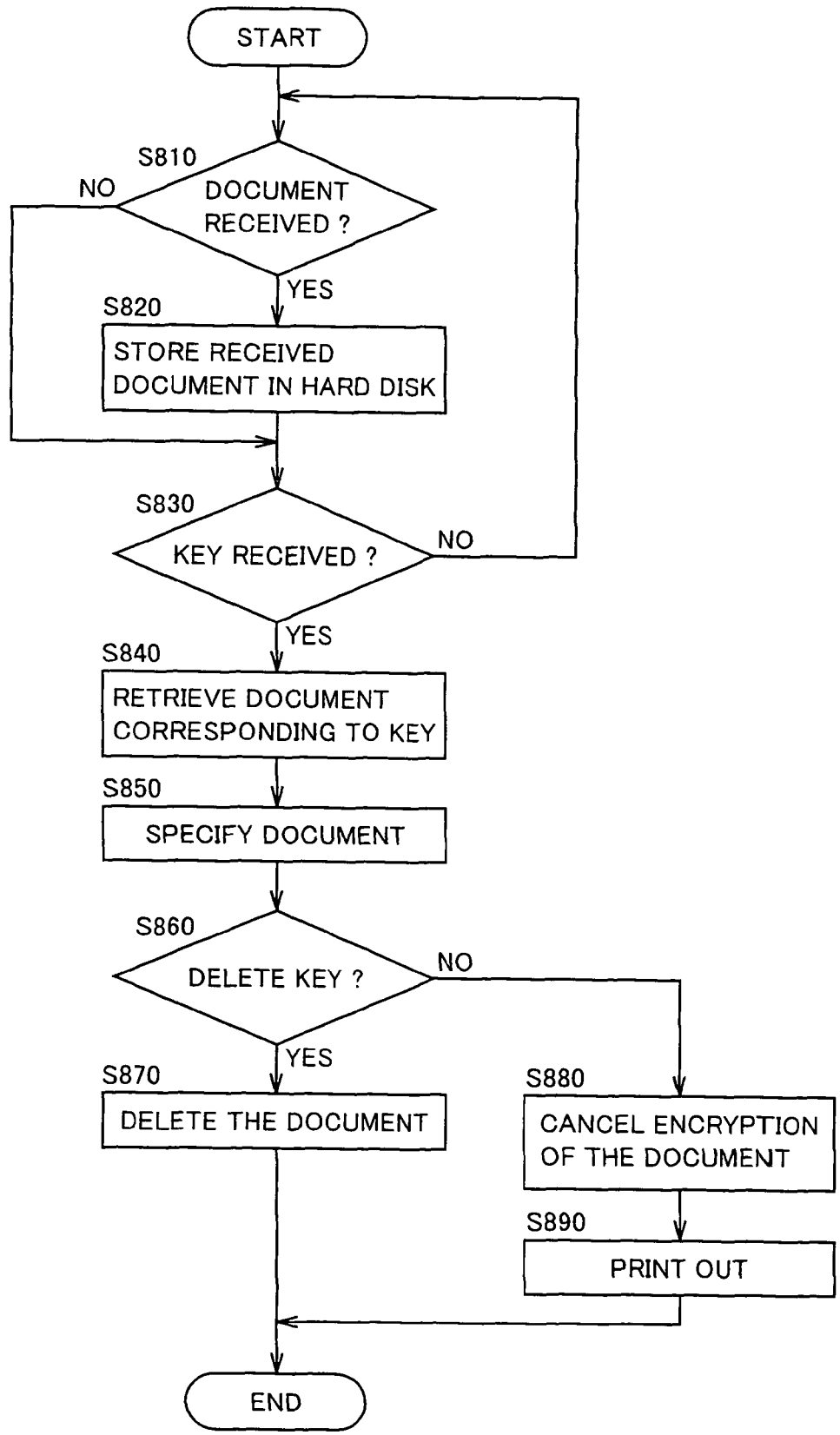
FIG. 12 is a flowchart of processing carried out in an apparatus that has received data from the image processing apparatus that is the fourth embodiment of the information processing apparatus of the present invention.

FIG. 12 is a flowchart of processing that is executed by CPU 250 on the receiving side (receiver-side apparatus 200) when the apparatus receives information from the information processing apparatus of the present embodiment.

Referring to FIG. 12, firstly in step S810, CPU 250 determines whether a document has been received. If yes, in step S820, it stores the received document in hard disk 255, and the process proceeds to step S830. If it is determined that the document has not been received, the process directly proceeds to step S830.

In step S830, CPU 250 determines whether decryption key 162 or delete key 163 has been received. If it is determined that either of them has been received, the process proceeds to step S840. If it is determined that neither of them has been received, the process returns to step S810.

In step S840, CPU 250 retrieves the document (encrypted document) corresponding to the received key from hard disk 255, and it specifies the document in step S850.

In step S860, CPU 250 determines whether the received key is delete key 163 or not. If it is determined as delete key 163, in step S670, it deletes the document (encrypted document) specified in step S850 from hard disk 255, and the processing is terminated. If it is determined that the received key is not delete key 163, in step S880, CPU 250 uses the received key (decryption key 162) to decode the corresponding encrypted document (cancellation of encryption), and then, in step S890, it causes output unit 282 to print out the decoded document, and the processing is completed.

In the embodiment described above, in receiver-side apparatus 200, after receiving the encrypted document, the relevant encrypted document is automatically deleted once the delete key is received (without the need of operation of the user or the like). When the decryption key is received, the encrypted document is automatically decoded and printed out.

Further, in the embodiment described above, after the encrypted document is transmitted, a mail address (destination) of the user who has designated the destination for transmitting the relevant encrypted document is specified, and a mail (decryption key transmission acceptance/denial mail) is transmitted to the specified destination for designating the destination for transmitting the decryption key (or the destination for transmitting the delete key) from among the destinations to which the encrypted document was transmitted.

It is noted that when the encrypted document is transmitted to a plurality of destinations in step S670, it is preferable that the decryption key transmission acceptance/denial mail is transmitted to each destination. This allows the user to set whether to transmit the decryption key or the delete key for each destination.

Further, the decryption key transmission acceptance/denial mail is preferably transmitted after a prescribed period of time has passed since the transmission in step S670 was completed.

In each of the embodiments described above, the case of transmitting a file by an electronic mail has been shown by way of example. The present invention however may also be applicable to the case where a file is transmitted by designating an IP (Internet Protocol) address or the case where a file is transmitted by designating a telephone number.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing apparatus, comprising:
a scanning unit reading an image to create a document;
an encrypting portion encrypting the document;
a document transmission destination receiving portion receiving designation of a destination for transmitting the document encrypted by said encryption portion;
a storage portion storing the destination received by said document transmission destination receiving portion;
a first transmission portion transmitting the document encrypted by said encryption portion to the destination received by said document transmission destination receiving portion;
a determination portion determining whether the destination stored in said storage portion is a correct destination; and
a second transmission portion transmitting a decryption key of the document encrypted by said encryption portion to the destination when said determination portion determines that it is the correct destination,
wherein said determination portion includes a key transmission destination receiving portion receiving designation of a destination for transmitting the decryption key of the document encrypted by said encryption portion, and a comparison portion comparing the destination received by said key transmission destination receiving portion with the destination stored in said storage portion, and said determination portion determines the destination received by said key transmission destination receiving portion and stored in said storage portion to be the correct destination.

2. The information processing apparatus according to claim 1, further comprising a third transmission portion transmitting information for deleting the document encrypted by said encryption portion to the destination when said determination portion determines that it is not the correct destination.

3. The information processing apparatus according to claim 1, wherein said key transmission destination receiving portion receives designation of the destination for transmitting said decryption key, from among the destinations stored in said storage portion.

4. The information processing apparatus according to claim 3, wherein
said key transmission destination receiving portion further receives designation of a destination for transmitting information for use in deleting the document encrypted by said encryption portion, from among the destinations stored in said storage portion, the information processing apparatus further comprising:
a third transmission portion transmitting said information for use in deleting to said destination for transmitting said information for use in deleting that was received by said key transmission destination receiving portion.

5. The information processing apparatus according to claim 1, further comprising:
a display portion displaying information for use in determining whether the destination stored in said storage portion is a correct destination or not after a lapse of a prescribed period of time since the document encrypted by said encryption portion was transmitted by said first transmission portion, and also displaying a screen for inputting a determination result as to whether it is the correct destination or not, wherein
said determination portion determines whether the destination stored in said storage portion is the correct destination or not based on said determination result input to the screen displayed by said display portion.

6. The information processing apparatus according to claim 5, wherein said information for use in determination includes information specifying the destination to which said first transmission portion transmitted the document.

7. The information processing apparatus according to claim 5, wherein said display portion displays the screen for inputting, as said determination result, information designating a destination for transmitting the decryption key of the document encrypted by said encryption portion.

8. The information processing apparatus according to claim 5, wherein said second transmission portion transmits said decryption key to the destination stored in said storage portion when said determination result is not input within a prescribed period of time after said first transmission portion transmitted the document encrypted by said encryption portion.

9. The information processing apparatus according to claim 1, further comprising:
a specification portion specifying a destination of the user who designated the destination to said document transmission destination receiving portion; and
an information transmission portion transmitting information for use in determining whether the destination stored in said storage portion is a correct destination or not to the destination specified by said specification portion after said first transmission portion transmitted the document encrypted by said encryption portion.

10. A program product stored on a non-transitory tangible computer readable medium and configured to control an apparatus transmitting a document, the program product causing a computer to execute:
a scanning step of reading an image to create a document;
an encryption step of encrypting the document;
a document transmission destination receiving step of receiving designation of a destination for transmitting the document encrypted in said encryption step;
a storing step of storing the destination received in said document transmission destination receiving step;
a first transmission step of transmitting the document encrypted in said encryption step from to the destination received in said document transmission destination receiving step;
a determination step of determining whether the destination stored in said storing step is a correct destination; and a second transmission step of transmitting a decryption key of the document encrypted in said encryption step to the destination determined to be the correct destination in said determination step,
wherein said determination step includes a key transmission destination receiving step comprising receiving designation of a destination for transmitting the decryption key of the document encrypted by said encryption step, and a comparison step comparing the destination received by said key transmission destination receiving step with the destination stored in said storing step, and said determination step determines the destination received by said key transmission destination receiving step and stored in said storing step to be the correct destination.

11. The program product according to claim 10, causing said computer to further execute a third transmission step of transmitting information for use in deleting the document encrypted in said encryption step to the destination determined not to be the correct destination in said determination step.

12. The program product according to claim 10, causing said computer to further execute a display step of displaying information for use in determining whether the destination stored in said storing step is a correct destination or not after a lapse of a prescribed period of time since said encrypted document was transmitted in said first transmission step, and also displaying a screen for inputting a determination result as to whether it is the correct destination or not, wherein
said determination step includes the step of determining whether the destination stored in said storing step is the correct destination or not based on said determination result input to the screen displayed in said display step.

13. The program product according to claim 12, wherein said second transmission step includes the step of transmitting said decryption key to the destination stored in said storing step when said determination result is not input within a prescribed period of time after said encrypted document was transmitted in said first transmission step.

14. The program product according to claim 10, further causing the computer to execute:
a specification step of specifying a destination of the user who designated the destination to said document transmission destination receiving step; and
an information transmission step of transmitting information for use in determining whether the destination stored in said storing step is a correct destination or not to the destination specified in said specification step after said encrypted document is transmitted in said first transmission step.

15. A control method of an information processing apparatus including a storage device and transmitting a document, comprising:
a scanning step of reading an image to create a document;
an encryption step of encrypting the document;
a document transmission destination receiving step of receiving designation of a destination for transmitting the document encrypted in said encryption step;
a storing step of storing the destination received in said document transmission destination receiving step in said storage device;
a first transmission step of transmitting the document encrypted in said encryption step to the destination received in said document transmission destination receiving step;

a determination step of determining whether the destination stored in said storing step is a correct destination; and a second transmission step of transmitting a decryption key of the document encrypted in said encryption step to the destination determined to be the correct destination in said determination step, wherein said determination step includes a key transmission destination receiving step comprising receiving designation of a destination for transmitting the decryption key of the document encrypted by said encryption step, and a comparison step comparing the destination received by said key transmission destination receiving step with the destination stored in said storing step, and said determination step determines the destination received by said key transmission destination receiving step and stored in said storing step to be the correct destination.

16. The control method of an information processing apparatus according to claim 15, further comprising a third transmission step of transmitting information for use in deleting the document encrypted in said encryption step to the destination determined not to be the correct destination in said determination step.

17. The control method of an information processing apparatus according to claim 15, further comprising a display step of displaying information for use in determining whether the destination stored in said storing step is a correct destination or not after a lapse of a prescribed period of time since said encrypted document was transmitted in said first transmission step, and also displaying a screen for inputting a determination result as to whether it is the correct destination or not, wherein said determination step includes the step of determining whether the destination stored in said storing step is the correct destination or not based on said determination result input to the screen displayed in said display step.

18. The control method of an information processing apparatus according to claim 17, wherein said second transmission step includes the step of transmitting said decryption key to the destination stored in said storing step when said determination result is not input within a prescribed period of time after said encrypted document was transmitted in said first transmission step.

19. The control method of an information processing apparatus according to claim 15, further comprising:

a specification step of specifying a destination of the user who designated the destination to said document transmission destination receiving step; and an information transmission step of transmitting information for use in determining whether the destination stored in said storing step is a correct destination or not to the destination specified in said specification step after said encrypted document is transmitted in said first transmission step.

* * * * *